W. DERBY.
HEADLIGHT FOR VEHICLES.
APPLICATION FILED JUNE 9, 1908.
907,225.
Patented Dec. 22, 1908.
2 SHEETS—SHEET 1.
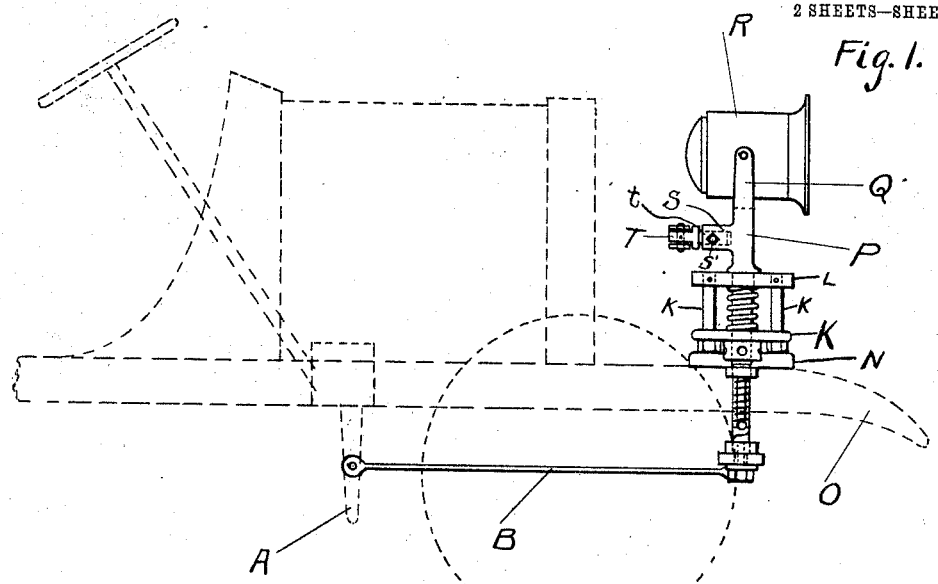
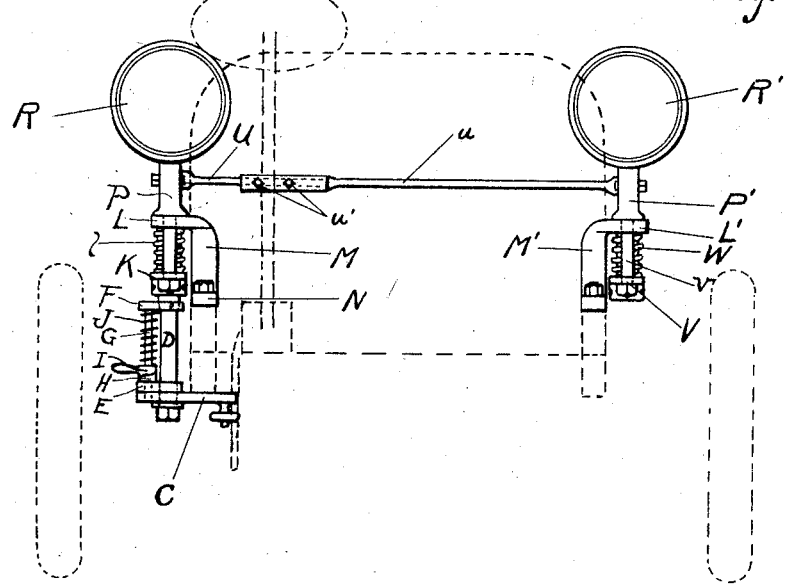
Witnesses:
Inventor:

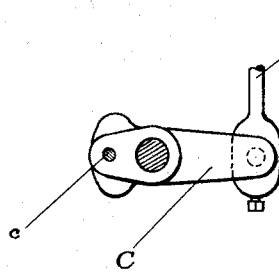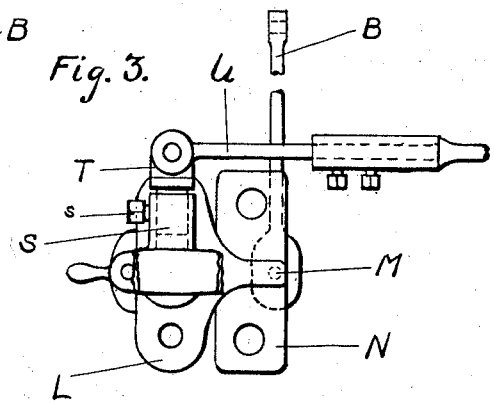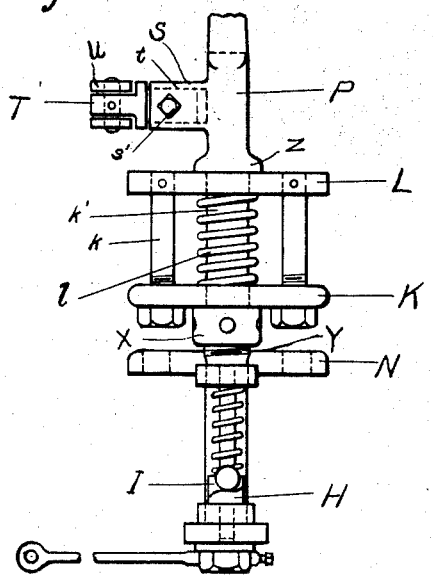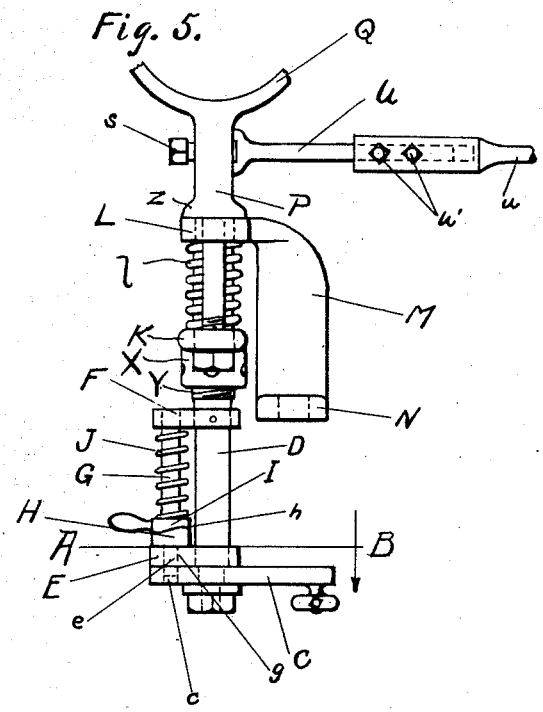

UNITED STATES PATENT OFFICE.

WILFRED DERBY, OF BOSTON, MASSACHUSETTS.

HEADLIGHT FOR VEHICLES.

No. 907,225.  Specification of Letters Patent.  Patented Dec. 22, 1908.

Application filed June 9, 1908. Serial No. 437,482.

*To all whom it may concern:*

Be it known that I, WILFRED DERBY, a citizen of the United States, residing at Boston, in the county of Suffolk and State of Massachusetts, have invented a new and useful Improvement in Headlights for Vehicles; and I do hereby declare that the following is a full, clear, and exact description of the same, reference being had to the accompanying drawings, and to the characters of reference marked thereon, which form a part of this specification.

This invention relates to means for changing the position of lamps on vehicles through the operation of the steering gear on said vehicles.

An object of this invention is to provide novel means whereby the movement of the steering gear communicates motion to the lamp support for the purpose of rotating or partially rotating the said lamp support with relation to the vehicle frame, thus directing the rays of light in the direction the vehicle is to travel.

A further object of this invention is to provide a lamp support with springs or other cushions to absorb vibration and jar, the said cushions being preferably applied under the brackets supporting the lamps; furthermore, an object of this invention is to provide means for moving the lamps on two sides of a vehicle in unison from a single actuating device.

Finally an object of this invention is to produce a novel device of the character noted, which will possess advantages in points of simplicity, efficiency and durability, proving at the same time comparatively inexpensive to manufacture.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 1, is a view in elevation illustrating a fragment of a vehicle in dotted lines with the invention shown in elevation applied thereto; Fig. 2, is a front view thereof; Fig. 3, is a top plan view of the lamp support with the lamp removed; this view also showing a fragment of the connecting rod; Fig. 4, is an enlarged detail view of the lamp support in the same position as it is shown in Fig. 1; Fig. 5, is an enlarged detail view thereof, as it appears in Fig. 2; and Fig. 6, is a sectional view on the line A—B of Fig. 5.

In these drawings A, indicates a steering arm of a vehicle; B, is a link connected thereto and adapted to take motion therefrom, said link being connected to a lever C, which is mounted on the lower end of the shaft D. Arms E, and F, are secured to the shaft D, the arm F, having an aperture to receive a rod G, slidable in the boss H, on the arm E, and the said arm E, has an aperture $e$, in which the reduced end $g$, of the rod G, is slidable. The boss H, has a beveled surface $h$, and the cam I, which is attached to the rod G, is rotatable with relation to the boss and as it rotates, it moves over the beveled surface of the boss and the rod G, is thereby raised or lowered according to the direction of rotation of the cam. The rod G, is encircled by a spring J, which bears against the arm F, and cam I, whereby the said cam is held in engagement with the boss. It will be understood that in operation, the movement of the cam tends to elevate the rod G, thereby moving its reduced end $g$ with relation to the lever C, and the lever C, has an aperture $c$, into which the reduced end of the rod projects when the rod is depressed.

Through the mechanism just described, movement of the lever C, is communicated to the shaft D, when the reduced end of the rod G, is in the aperture $c$, of the lever. When, however, the cam has been partially rotated and the rod G, is elevated so that the reduced end $g$, is out of the aperture $c$, then the oscillation of the lever C, would not be communicated to the arms E, and F, and hence the shaft D, will not rotate. This provision for disengaging the lever is for the purpose of permitting the lamps to remain stationary with relation to the frame of the vehicle regardless of the movement of the steering gear. The shaft D, is provided at its upper end with a cross arm K, which cross arm is connected to a cross arm L, on the upper end of the bracket M and is supported in its lowermost position by a suitable nut $x$ which is mounted on the enlarged screw threaded portion Y of the shaft D adapting said nut for adjustment to compensate for the wear of the spring under the pressure of the cross arm L. The bracket M has a base N, adapted to be secured to a side frame such as O, of a vehicle running gear. The shaft D has above the arm L, an extended portion or standard P, with diverging arms Q, on which the lamp R, is mounted in any suitable manner. The standard P, is provided with a shoulder Z, adapted for supporting the same and parts connected thereto against the action of the spring S, said shoulder being adapted to contact with the cross arm L, of the bracket M. The cross arms K, and L, are connected by bolts k, which pass freely through the cross arm K and have threaded ends to receive nuts which retain the parts in operative relation and for the purpose of cushioning the lamp and to prevent effect of vibration and jar, a spring l, is interposed between the cross arms K, and L, and is confined therein by the shank k′ said shank being a portion of an extension of the shaft D, which forms the standard P also. The standard P, has a hollow boss S, to receive a set bolt s. An apertured head T, has a shank t, secured in the hollow boss and one joint U, of a connecting rod is secured to said head T.

From the foregoing description, it will be observed that the motion of the link is communicated to the standard P, through the medium of the mechanism heretofore described, and that as the lamp is mounted on said standard, the lamp will be turned from side to side under the control of the steering mechanism so long, of course, as the lever C, is coupled to the arm E, as heretofore described.

For the purpose of turning the lamp R′, simultaneously with the lamp R, the joint U, of the connecting rod is adjustably secured to another joint u, thereof, through the medium of the set bolts U′, it being understood that the end of the joint u, has a socket to receive the end of the joint U. The opposite end of the joint u, is connected to a boss on the standard by a coupling similar to that utilized on the opposite standard and said standard is supported by a cross arm L′, on the bracket M′. A cross arm V, is connected to the cross arm L′, by bolts v, similar to the bolts k, shown in Fig. 4, and a spring W, is interposed between the cross arm L′, and the cross arm V, for the purpose of absorbing vibration.

I claim

1. In a lamp support for vehicles, a bracket secured to the vehicle frame, a shaft journaled in the bracket for supporting a suitable lamp, means for rotating said lamp simultaneously with the steering gear of the vehicle, arms connected to the shaft and means intermediate the arms whereby the rotation of the shaft may be thrown into and out of operation.

2. In a lamp support for vehicles, a bracket connected to the vehicle, a cross arm on the bracket, a lamp supporting member on the cross arm, a shaft supporting a cross arm, arms on the shaft, a lever, means for oscillating the lever, a detent extending through one of the arms on the shaft and engaging the lever for coupling the lever to partially rotate the shaft.

3. In a lamp support for vehicles, brackets secured to the vehicle frame, cross arms on the brackets, lamp supporting shafts having shoulders forming bearings for the shaft and adapted to rest on the cross arms, means for rotating both shafts in unison, arms on one of the shafts, and means mounted on a rod intermediate the arms whereby said rotation of the shafts may be prevented.

4. In a lamp support for vehicles, a bracket having a cross arm, a standard on the cross arm, a shaft having a cross arm, means for connecting the cross arms of the shaft and bracket, a spring interposed between the cross arms, a shank extending through the spring, and means for partially rotating the shaft.

5. In a lamp support for vehicles, a bracket having a cross arm, a standard on the cross arm, a shaft having a cross arm, means for connecting the cross arms of the shaft and bracket, a spring interposed between the cross arms, a shank extending through the spring, arms on the shaft, a boss on one of the arms, a rod having a reduced end extending through the boss and arm, a lever on the shaft having an aperture to receive the end of the rod whereby the lever is coupled to partially rotate the shaft.

6. In a support for vehicle lamps, a bracket having a cross arm, a shaft, having bearings in the cross arm, said shaft having an extension or lamp supporting standard, a cross arm adjustably mounted on the shaft, bolts connected to said first mentioned cross arm movable through the second mentioned cross arm, a spring around the shaft intermediate the cross arms and means for rotating the shaft.

7. In a lamp support for vehicles, brackets secured to the vehicle, shafts journaled in the brackets supporting the lamps, means acting to hold the lamps against jar from downward movement of the brackets, means for imparting simultaneous rotary movement to the shafts with movement of the steering gear of the vehicle, and means connected with one of the shafts whereby the rotation thereof is prevented.

WILFRED DERBY.

Witnesses:
  O. A. TAFT,
  H. W. RUGG.